US007081589B1

(12) United States Patent
Advey et al.

(10) Patent No.: US 7,081,589 B1
(45) Date of Patent: Jul. 25, 2006

(54) BATTERY CABLE TERMINAL WITH AUXILIARY ATTACHMENT FEATURE

(75) Inventors: Alexander J. Advey, Ypsilanti, MI (US); Michael J. Gniewek, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 11/130,987

(22) Filed: May 17, 2005

(51) Int. Cl.
*H02G 15/02* (2006.01)

(52) U.S. Cl. ....................................... 174/78; 174/84 C

(58) Field of Classification Search .............. 174/84 C, 174/75 C, 78; 439/763, 801, 883; D13/148, D13/154
See application file for complete search history.

(56) References Cited

U.S. PATENT DOCUMENTS

| | | | | |
|---|---|---|---|---|
| D133,267 | S * | 8/1942 | Burt | D13/154 |
| 2,668,279 | A | 2/1954 | Epstein | |
| 5,295,860 | A | 3/1994 | Jozefczyk et al. | |
| 5,707,258 | A * | 1/1998 | Pilotti | 439/763 |
| 5,759,055 | A * | 6/1998 | Colantuano et al. | 439/287 |
| 6,259,028 | B1 | 7/2001 | Senma | |
| 6,280,263 | B1 * | 8/2001 | Manor et al. | 439/801 |
| 6,599,137 | B1 | 7/2003 | Modina | |

* cited by examiner

*Primary Examiner*—Chau N. Nguyen
(74) *Attorney, Agent, or Firm*—Young & Basile, P.C.

(57) ABSTRACT

An automotive battery cable grounding terminal having an integral attachment appendage adapted to serve as an attachment or anchor point for a plastic cover, a secondary cable or a combination of the two.

6 Claims, 4 Drawing Sheets

BATTERY CABLE TERMINAL WITH AUXILIARY ATTACHMENT FEATURE

FIELD OF THE INVENTION

This invention relates to terminations for cables of the type used to ground automotive batteries. More particularly, the invention comprises a grounding terminal having a flat tab portion and an additional appendage integral, but not coplanar with the tab portion and extending therefrom for auxiliary attachment purposes.

BACKGROUND OF THE INVENTION

It is known to terminate automotive vehicle battery cables using a flat metal tab having one or more apertures therein and a crimpable collar portion formed by opposing tabs near one end. Studs are used to secure the flat tab to an automotive vehicle body portion to provide, for example, a ground plane for the automotive vehicle's electrical system. In many cases, it is undesirable to leave the grounding terminal exposed in the vehicle engine compartment.

SUMMARY OF THE INVENTION

By way of the present invention, an auxiliary attachment feature for cable terminations of the type described above is provided. The auxiliary attachment feature comprises a tab-like appendage which is integral, but non-coplanar with the attachment tab of the cable terminal and, in the typical form, includes at least one aperture formed therein. The integral appendage may be used in a variety of ways; in one example hereinafter described in detail, the attachment tab is used to provide a non-electrical, securing point for a second cable or wiring harness which happens to pass over the primary terminated cable thereby to prevent abrasion and wear between the two cables. In another example, the integral appendage is used to attach a plastic cover which protects the battery cable termination and an end portion of the battery cable itself, a snap latch made integral with the cover is conveniently provided for this purpose. In a still further example the appendage may be used to provide an attachment point for a cover which itself is also adapted to non-electrically secure a second cable at a midpoint in the manner described above.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
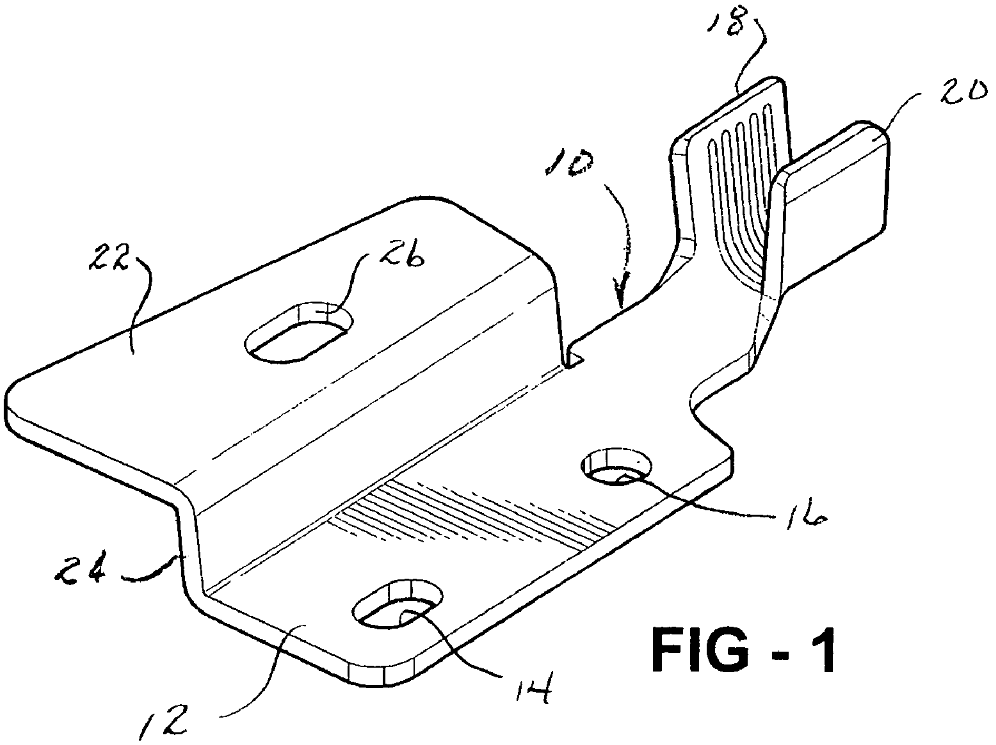
FIG. 1 is perspective use of a first embodiment of the invention.

FIG. 1 shows the invention in the form of a battery cable grounding terminal 10 comprising the integral combination of a flat plated metal tab 12 having apertures 14 and 16, opposed crimping tabs 18 and 20, and an integral tab-like appendage 22 non-coplanar with the flat tab 12 and joined thereto by a transition leg 24. An aperture 26 of oval shape is formed in the integral tab-like appendage 22.

As will be apparent to those skilled in the art, opposed tabs 18 and 20 are adapted to be crimped over the exposed ends of a battery cable as hereinafter described and the apertures 14 and 16 are used to secure the tab 12 to an automotive body panel for grounding purposes. The terminal device is, for example, a stamping made of 10/20 steel which is thereafter bent into the shape shown and tin plated.

Figure 2:
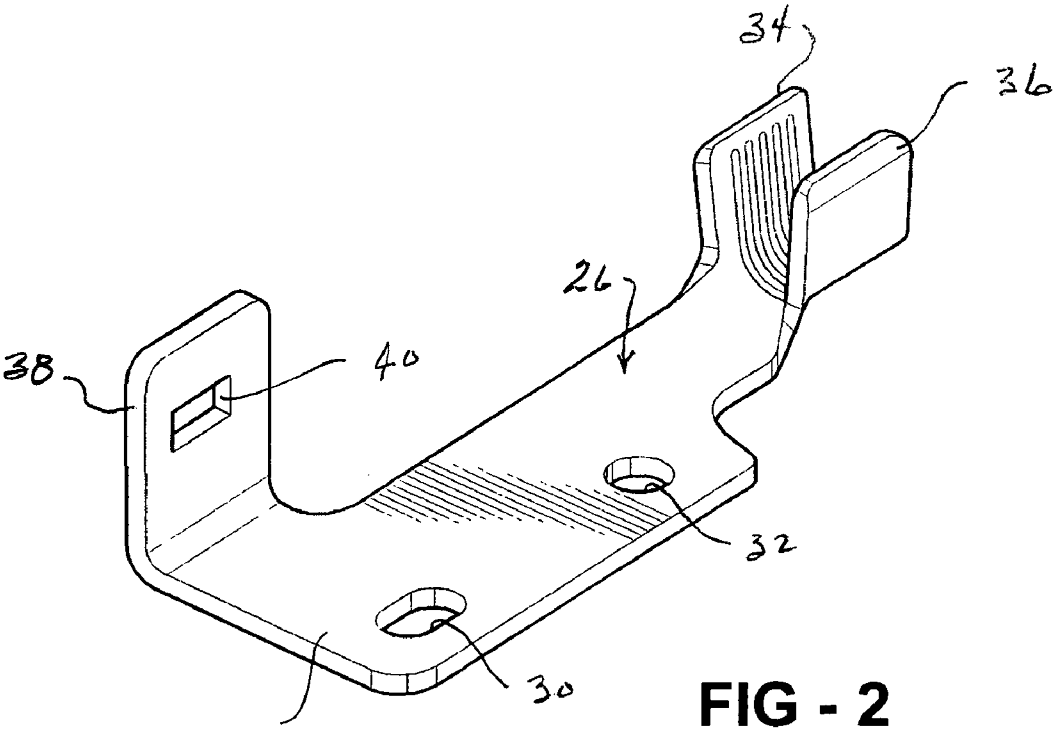
FIG. 2 is a perspective view of a second embodiment of the invention.
Figure 3:
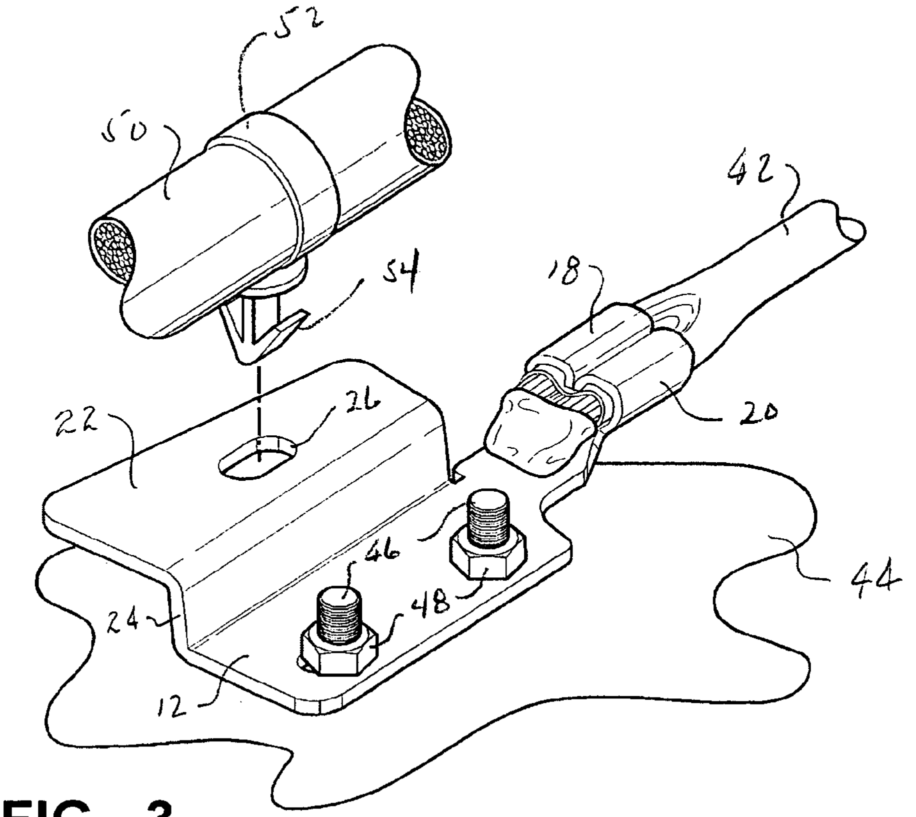
FIG. 3 is a perspective view of the first embodiment of the invention, together with a clip which is used to non-electrically secure a second cable to the cable termination of the present invention.

FIG. 2 shows a second embodiment of the invention in the form of a battery cable termination 26 comprising a flat metal tab 28 having apertures 30 and 32 formed therein. Opposed crimping tabs 34 and 36 are arranged similar to the tabs 18 and 20 in FIG. 1 and an auxiliary attachment appendage 38 is formed integrally with the tab 28 so as to extend outwardly and upwardly therefrom adjacent the near end as shown is FIG. 2. An aperture 40 of rectangular shape is formed in the integral appendage 38 for purposes to be described. Again, the termination 26 is formed by stamping an appropriate pattern out of a sheet of 10/20 steel. The stamping is then bent into the shape shown in FIG. 2 and tin plated for added conductivity.

Referring now to FIGS. 3–7, various applications of the illustrative embodiments of FIGS. 1 and 2 will be described. Looking first to FIG. 3, the embodiment of FIG. 1 is shown with a battery cable 42 securely attached to the tab 12 by means of the crimping tabs 18 and 20. The tab 12 is secured to the body panel 44 of an automotive vehicle by means of studs 46 and nuts 48. The integral appendage 22, being raised relative to the body panel by transition leg 24 is appropriately oriented and spatially located to provide an attachment point for the midpoint of a second cable 50 or wiring harness having a tie band 52 tied there around. The tie band is formed integrally with a barb-like clip 54 which is adapted to be pushed through the oval aperture 26 to secure the cable 50 thereto. This arrangement provides no electrical connection, but anchors the cable or wiring harness 50 to prevent abrasion and wear and possible short circuiting.

Figure 4:
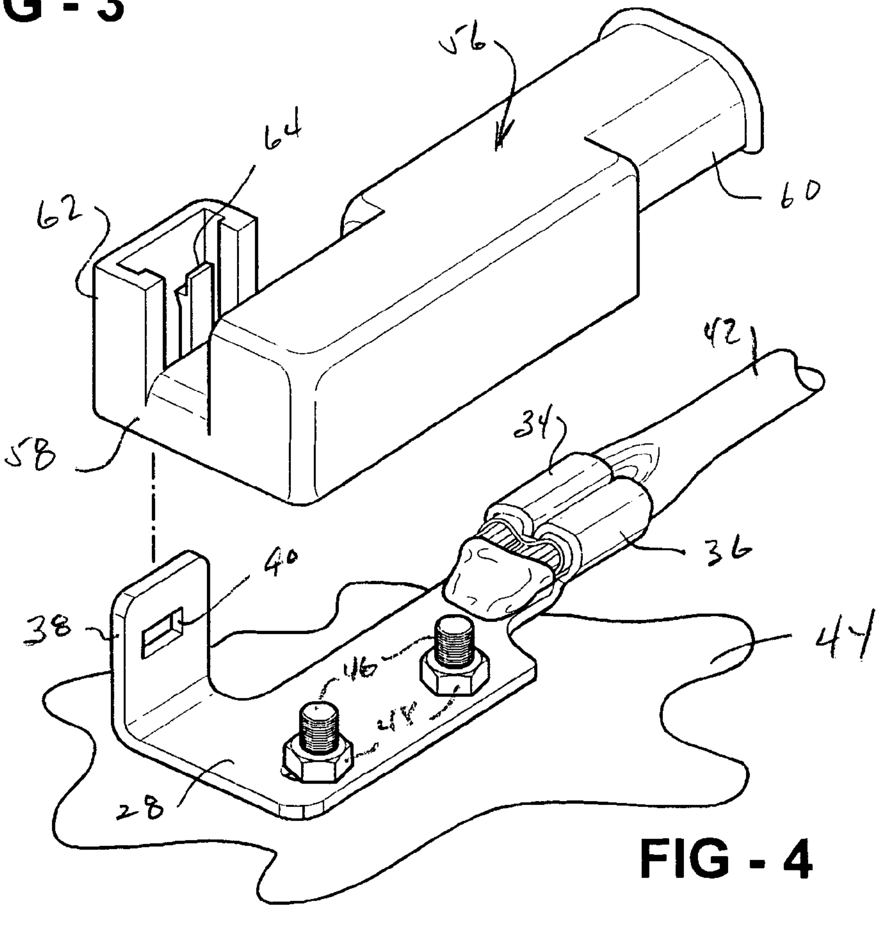
FIG. 4 is a perspective view of the embodiment of FIG. 2 in a battery cable termination application, together with a protective plastic cover having a snap latch feature.

Looking now at FIG. 4, the terminal 26 in FIG. 2 is shown secured to the automotive body panel 44 by means of studs 46 and nuts 48. The integral appendage 38 rises upwardly from the tab 28 at right angles thereto, although it may be bent in any direction from the right angle orientation shown in FIG. 4.

FIG. 4 further includes a rigid plastic cover 56 having a wide base portion 58 adapted to fit over and enclose the terminal base tab 28, and a neck portion 60 which is adapted to fit over the crimping tab 34 and 36 and a portion of the battery cable 42.

Formed integrally with the cover 56 is a continual snap latch 62 forming a channel which opens to the bottom of the cover 56 to receive the integral appendage 38 therein and a resilient tab 64 which snaps into the aperture 40 to secure the cover to the terminal 26.

Figure 5:
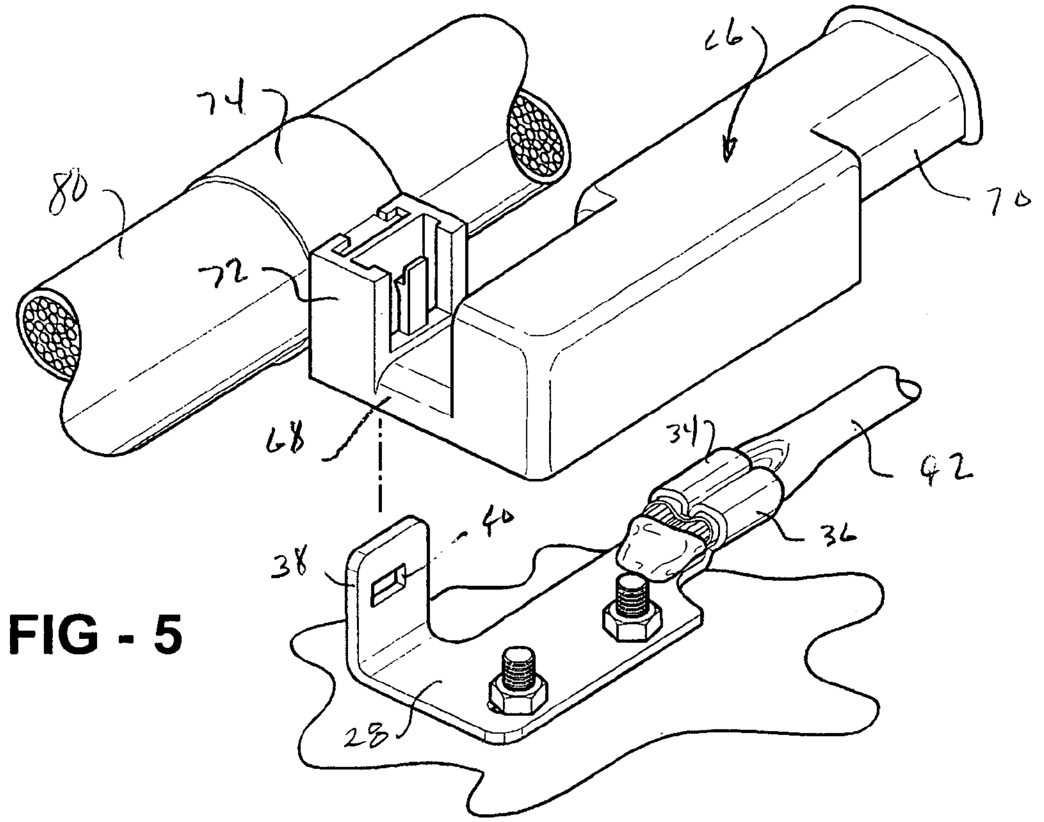
FIG. 5 is a perspective view of the embodiment of FIG. 2 used as a battery cable termination and further including a protective cover with a snap latch feature and a provision for non-electrically securing a second cable to the cover.

Looking now to FIG. 5, the still further application of the embodiment of FIG. 2 is shown, wherein again the tab 28 is secured to the automotive body portion 44 and connected to a battery cable 42 by means of the crimping tabs 34 and 36. A rigid plastic cover 66, having a base portion 68 fitting over the terminal device 26, also has a neck portion 70 which fits over the crimping tabs 34, 36 and a portion of battery cable 42. The cover 66, like the cover 56, has a snap latch appendage 72 for attachment to the tab 38 by way of the aperture 40 in the manner described above. However, integral with the snap latch 72 is a tie band 74 of plastic or other resilient, pliable material which is wrapped around the cable or wiring harness 80 to provide a non-electrical attachment at a midpoint thereof, thus anchoring the cable or wiring harness 80 relative to the cover 66 so that it does not move against the terminal 26.

Figure 6:
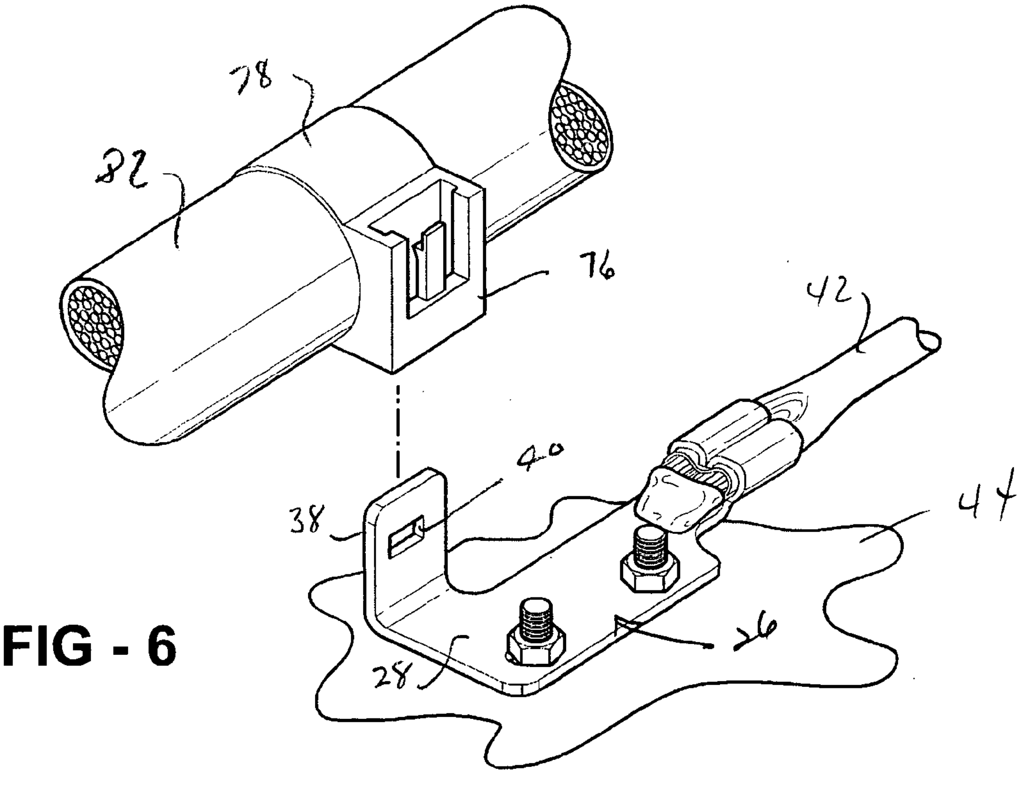
FIG. 6 is a perspective view of the embodiment of FIG. 2, together with a snap latch type cable tie used to non-electrically secure a second cable at a midpoint thereof.

FIG. 6 shows a somewhat simplified arrangement of the terminal device 26, again connected to the battery cable 42 and the automotive body panel 44 by the means previously described. In this case, a snap latch 76 having an integral cable tie band is non-electrically attached to a cable or wiring harness 82, but has no counterpart to the plastic cover 66 shown in FIG. 5. Instead, the snap latch 76 connects the cable 82 directly to the integral attachment appendage 38.

Figure 7:
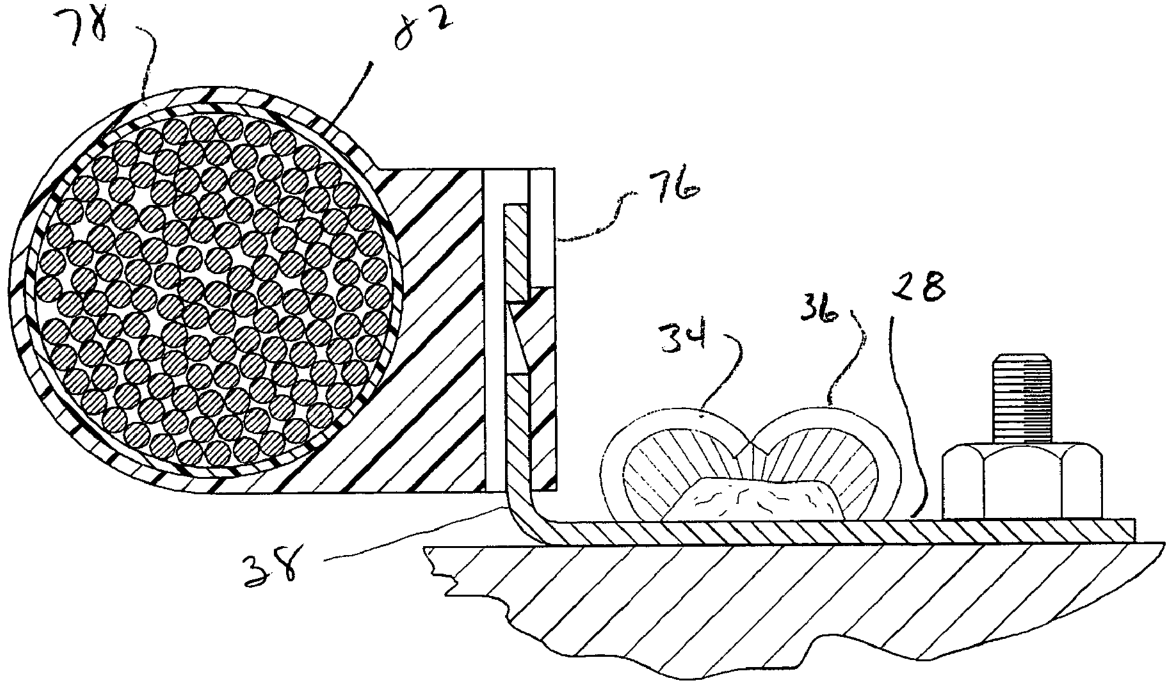
FIG. 7 is a sectional view of a snap latch of the type used in the embodiments of FIGS. 5 and 6.

FIG. 7 shows the detail of the snap latch 76 in section, along with the crimping tabs 34 and 36 and the upstanding integral attachment tab 38.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrical cable termination device of the type comprising a flat tab with one or more fastener locations therein and a crimping collar portion for attachment to a cable, wherein the improvement comprises:

a transition leg integral with and extending at an angle from the flat tab;

an appendage integral with the transition leg and extending therefrom, the appendage being in non-coplanar, non-overlying relationship with the flat tab, the appendage extending away from the flat tab in a plane parallel to the flat tab; and means for non-electrically securing a second cable to said integral appendage.

2. An electrical cable termination device of the type comprising a flat tab with one or more fastener locations therein and a crimping collar portion for attachment to the cable, wherein the improvement comprises:

an appendage integral with said tab and extending therefrom in non-coplanar relationship therewith, the integral appendage lying in a plane parallel to the flat tab and having at least one aperture formed therein; and means for non-electrically securing a second cable to the integral appendage, the means including a tie band adapted to be wrapped around said second cable and a clip for securing the tie band to the appendage.

3. An electrical cable termination device of the type comprising a flat tab with one or more fastener locations therein and a crimping collar portion for attachment to the cable, wherein the improvement comprises:

an appendage integral with said tab and extending therefrom in non-coplanar relationship therewith;

a rigid plastic cover which extends over said flat tab and said appendage and a portion of said cable; and means for attaching said plastic cover to said appendage.

4. The cable termination and cover combination defined in claim 3, wherein said means for attaching said cover to said appendage includes a snap latch.

5. The cable termination and cover combination as defined in claim 4, further including means for non-electrically attaching a second cable to said snap latch.

6. An electrical cable termination device of the type comprising a flat tab with one or more fastener locations therein and a crimping collar portion for attachment to the cable, wherein the improvement comprises:

an appendage integral with said tab and extending therefrom in non-coplanar relationship therewith; and a snap latch having a band portion adapted to be non-electrically secured around a second cable, said snap latch being of such size and design to receive said integral appendage therein in selectively removably lockable relationship therewith.

* * * * *